Feb. 20, 1923.
H. HORT.
FRICTION ROLLER DRIVE.
FILED AUG. 5, 1921.
1,446,347.
2 SHEETS—SHEET 1.
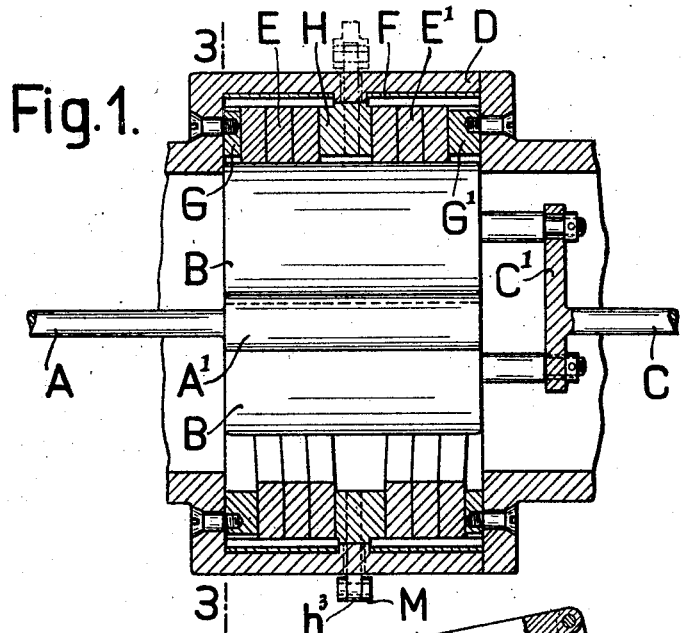
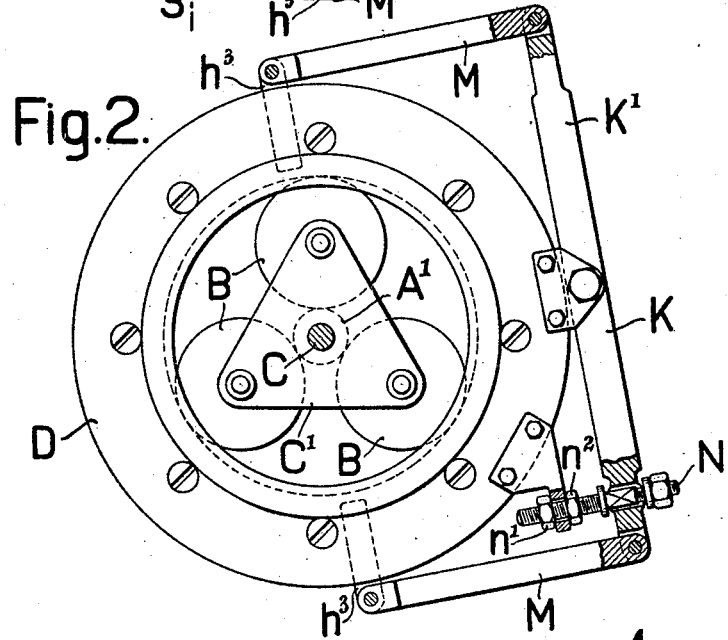
Inventor
Hermann Hort
By Knight Bros
Attys Feb. 20, 1923.
H. HORT.
FRICTION ROLLER DRIVE.
FILED AUG. 5, 1921.
1,446,347.
2 SHEETS—SHEET 2.
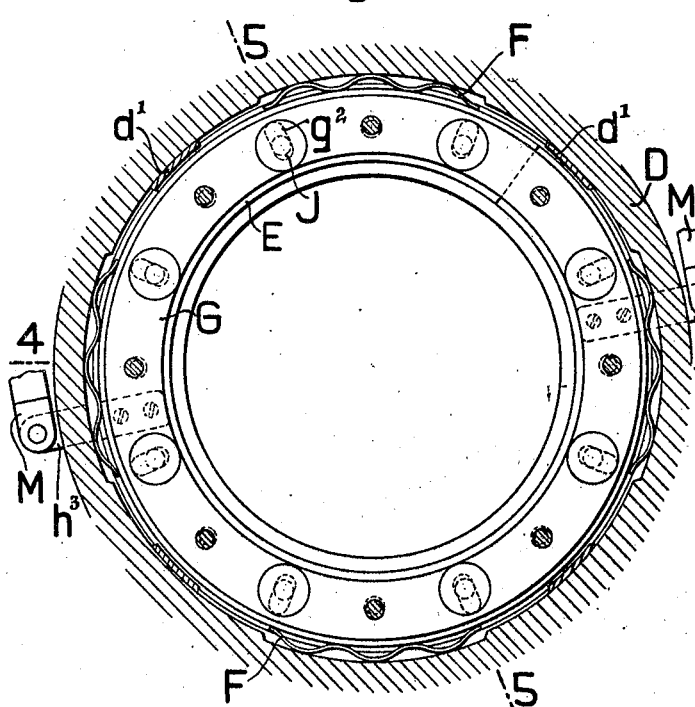
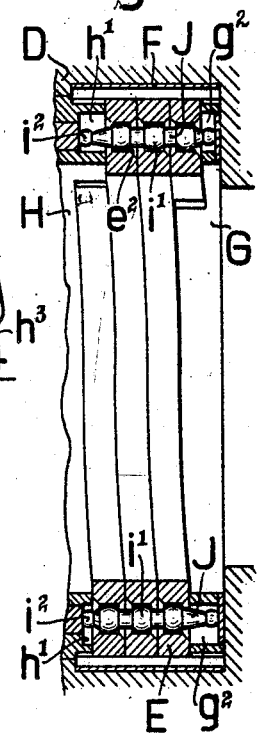

Patented Feb. 20, 1923.

1,446,347

UNITED STATES PATENT OFFICE.

HERMANN HORT, OF ESSEN, GERMANY, ASSIGNOR TO FRIED. KRUPP AKTIENGESELL-SCHAFT, OF ESSEN-ON-THE-RUHR, GERMANY.

FRICTION-ROLLER DRIVE.

Application filed August 5, 1921. Serial No. 490,105.

*To all whom it may concern:*

Be it known that I, HERMANN HORT, residing at Essen, Germany, a citizen of the German Republic, have invented a certain new and useful Improvement in Friction-Roller Drives (for which I have filed applications in Germany October 11, 1919, under Serial No. K. 70530 XII/47h$^2$; France, October 7, 1920; Great Britain, October 8, 1920), of which the following is a specification.

This invention relates to a friction roller drive suitable for heavy power transmission and excelling moreover by reason of its being adjustable to a most refined degree.

The invention will be described with reference to the accompanying drawing which shows one embodiment of the subject matter of the invention by way of example.

Fig. 1 shows an axial longitudinal section through the improved gear,

Fig. 2 a view of Fig. 1, looking from the right,

Fig. 3 a section on line 3—3 in Fig. 1, looking from the left with certain parts omitted, Fig. 4 a section on line 4—4 in Fig. 3, looking from the top, and Fig. 5 a section on line 5—5 in Fig. 3, looking from the left.

The free end of the driving shaft A constitutes a friction roller A$^1$. Upon this latter bear three friction rollers B, rotatably mounted on a flange C$^1$ of the driven shaft C (Figs. 1 and 2) and arranged so as to be capable of a slight radial shift. The friction rollers B are arranged within a two-part gear box D in a manner as to be unable to execute a shift in an axial direction. The said rollers are embraced by two multiple-spired helical springs E, E$^1$ of rectangular cross section, of which the one, E, is left-handed and the other, E$^1$, right-handed, this latter being staggered by 180° relatively to the former. The helical springs E, E$^1$ repose on initially tensioned plate springs F lodged within recess of the box or housing D, and are adapted to bear up on the inside of the housing against special stop surfaces $d^1$, forming parts of incompleted cylindrical drum contiguous to the housing (Fig. 3). The helical springs E, E$^1$ bear up, on the one hand, with their front ends remote from each other against suitably shaped rings G G$^1$ fixed to the box D and, on the other hand, with their inner front ends against a ring H the two front surfaces of which are shaped to correspond to the spires of the helical springs E, E$^1$. Said springs are further provided with a plurality of cylindrical holes $e^2$ passing through all the spires thereof and the edges of which are considerably broken away (Figs. 4 and 5). A bolt J is inserted into each of these holes $e^2$. Each of these bolts is provided with spherically shaped annular collars $i^1$, corresponding in number to the number of spires appertaining to the respective helical spring; each of these collars being lodged within the cylindrical portion of the holes $e^2$ and having a diameter corresponding exactly to the diameter of the holes. The extremities $i^2$ of the bolts J are ball-shaped, one of said extremities being lodged within a socket $g^2$ or $g^3$ of the outer ring G or G$^1$, while the other extremity is disposed within a socket $h^1$ or $h^2$ of the ring H; the arrangement being such that these extremities of the bolts are radially shiftable within their sockets and that the extremities of one side are each disposed within a plane lying at right angles to the axis of rotation. The ring H, for its part, is adjustable and this by intervention of a two-armed lever K, K$^1$ mounted on the outside of the box D and adapted to rock. Said lever is connected to the ring H by means of links M, articulated each, on the one hand, to one of the arms of the lever K, K$^1$, and, on the other hand, to an extension member $h^3$ fixed on the ring H. The lever K, K$^1$ is adapted to be fixed in its position (see particularly Fig. 2) by means of a screw N engaging the arm K and having a nut $n^1$ and a lock nut $n^2$.

By tightening the nut $n^1$ to a greater or less extent and by an appropriate displacement of the lock nut $n^2$, the helical springs E, E$^1$ will come to be coiled more or less, so that its diameter will be reduced and in consequence the rollers B will be forced to a larger or smaller degree against the roller A$^1$. Owing to the provision of multiple-spiral helical springs, the amount of this pressing action may be most accurately adjusted. The bolts J do not form an impediment to the adjustment of the helical springs E, E$^1$ in consequence of the spherical shape given to the collars $i^1$ as also of the edges of the holes $e^2$ being considerably broken away. During the adjustment, the ends $i^2$ of the bolts obtain a radial shift within their bearings $g^2$, $g^3$, $h^1$, $h^2$, while their longitudinal axis comes to be disposed obliquely to the axis of rotation. After the lever K, $K^1$ has been fixed in its position, the helical springs E, $E^1$ are likewise completely secured by the bolts J, so that no further deformation of the springs E, $E^1$ is liable to occur while the friction rollers B are in operation. Besides, owing to the arrangement of a right-handed and a left-handed helical spring, there is also no possibility of a unilateral side thrust being created while the friction rollers B are in motion.

As will be readily understood, the gear may be quickly thrown into or out of operation by a suitable displacement of the lever K, $K^1$. However, in order to secure a perfectly reliable working of the gear it is imperative that the rolling surface of the helical springs E, $E^1$, that is to say, their internal wall will be absolutely cylindrical in shape when in the position corresponding to the maximum degree at which the rollers B may be forced against the roller $A^1$. Hence the springs E, $E^1$ must prior to being employed in a state corresponding to the said degree of pressure, be turned off on the inside accurately to measure. It has been found expedient when doing the turning to slightly diminish the diameter of the helical springs E, $E^1$ over the state corresponding to maximum roller pressure, so that without compression they will have to be given a correspondingly smaller inside diameter. The advantage herefrom resulting is that the bending moments, which set up the twisting tension of the helical springs E, $E^1$ while the device is in operation, will practically reduce to zero.

Preferably both the helical springs E, $E^1$ and the rings G, $G^1$ and H are made out of one hollow cylinder, by cutting out of the said cylinder first a right-handed helical spring and then with an offset of 180° relatively thereto, a left-handed helical spring of uniform thickness, so that a ring will be left standing on each side of said spring. By displacing the helical springs for a distance of 180° relatively to each other, there is secured the advantage that the blank or ring remaining in the middle between two springs formed will have a comparatively uniform lateral dimension. After the rings have been detached, the helical springs are coiled up and compressed in a heated state in an axial direction, which accounts for the greater thickness of the springs over the thickness of the ring shown in Figs. 1, 4 and 5.

Claims:

1. In a friction roller drive comprising a stationary part, a driving roller, driven rollers and a counter-rolling ring formed by a helical spring, a device for adjusting the friction between said spring and said driven rollers, a plurality of engaging members disposed along the spire circle of said spring and connecting said spring to said adjusting device and to said stationary part.

2. In a friction roller drive comprising a stationary part, a driving roller, driven rollers and a counter-rolling ring, said ring being formed by a two-part helical spring, one part thereof having right-handed spires and the other part thereof left-handed spires, a device for adjusting the friction between said spring and said driven rollers, a plurality of engaging members disposed along the spire circle of said spring and connecting said spring to said adjusting device and to said stationary part.

3. In a friction roller drive comprising a stationary cage, a driving roller, driven rollers and a counter-rolling ring, said ring being formed by a two-part helical spring, one part thereof having right-handed spires and the other part thereof having left-handed spires, a ring adjustably mounted on said cage, a device for adjusting the friction between said spring and said driven rollers and attached to said adjustable ring. a plurality of engaging members disposed along the spire circle of said spring and connecting said spring to said adjusting device and to said cage, the spring ends at the sides of said spring parts remote from each other being connected to said cage and the spring ends at the sides of them turned towards each other being connected to said adjustable ring.

4. In a friction roller drive comprising a stationary cage, a driving roller, driven rollers and a counter-rolling ring, said ring being formed by a two-part helical spring, one part thereof having right-handed spires and the other part thereof having left-handed spires, a ring adjustably mounted on said cage, a device for adjusting the friction between said spring and said driven rollers and attached to said adjustable ring, a plurality of bores coaxially passing through the spires of at least one of said spring parts and disposed along the spire circle thereof, pins located in said bores and having ball-shaped faces each engaging a single spire-bore, said pins connecting said spring part to said adjusting device and to said cage, the spring ends at the sides of said two spring parts, remote from each other being connected to said cage and the ends at the sides of them turned towards each other being connected to said adjustable ring.

5. In a friction roller drive comprising a stationary cage, a driving roller, driven rollers and a counter-rolling ring, said ring being formed by a two-part helical spring, one part thereof having right-handed spires and the other part having left-handed spires, a ring adjustably mounted on said cage, a device for adjusting the friction between said spring and said driven rollers and attached to said adjustable ring, a plurality of bores coaxially passing through the spires of at least one of said spring parts and disposed along the spire circle thereof, pins located in said bores having their ends projecting beyond the front spires and having ball-shaped faces each engaging a single spire-bore, radial slots in said cage and in said adjustable ring corresponding in number to that of said pins, the projecting ends of said pins of one side of said spring part shiftably engaging said cage slots and the projecting ends of said pins of the other side of said spring part shiftably engaging said ring slots, the spring ends at the sides, of said two spring parts, remote from each other being connected to said cage and the spring ends at the sides of them turned towards each other being connected to said adjustable ring.

6. In a friction roller drive comprising a stationary cage, a driving roller, driven rollers and a counter-rolling ring, said ring being formed by a two-part helical spring, one part thereof having right-handed spires and the other part having left-handed spires, flat springs interposed between each of said spring parts and said cage, a ring adjustably mounted on said cage, a device for adjusting the friction between said spring and said driven rollers and attached to said adjustable ring, a plurality of bores coaxially passing through the spires of at least one of said spring parts and disposed along the spire circle thereof, pins located in said bores having their ends projecting beyond the front spires and having ball-shaped faces each engaging a single spire-bore, radial slots in said cage and in said adjustable ring corresponding in number to that of said pins, the projecting ends of said pins of one side of said spring part shiftably engaging said cage slots and the projecting ends of said pins of the other side of said spring part shiftably engaging said ring slots, the spring ends at the sides, of said two spring parts, remote from each other being connected to said cage and the spring ends at the sides of them turned towards each other being connected to said adjustable ring.

The foregoing specification signed at Essen, Germany, this 2nd day of July, 1921.

HERMANN HORT.